(12) United States Patent
Chatterjee et al.

(10) Patent No.: US 11,087,088 B2
(45) Date of Patent: Aug. 10, 2021

(54) AUTOMATED AND OPTIMAL ENCODING OF TEXT DATA FEATURES FOR MACHINE LEARNING MODELS

(71) Applicant: Accenture Global Solutions Limited, Dublin (IE)

(72) Inventors: Ajay Chatterjee, Kolkata (IN); Shubhashis Sengupta, Bangalore (IN); Milind Savagaonkar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 188 days.

(21) Appl. No.: 16/141,644

(22) Filed: Sep. 25, 2018

(65) Prior Publication Data
US 2020/0097545 A1    Mar. 26, 2020

(51) Int. Cl.
*G06F 40/30* (2020.01)
*G06N 20/00* (2019.01)

(52) U.S. Cl.
CPC ........... *G06F 40/30* (2020.01); *G06N 20/00* (2019.01)

(58) Field of Classification Search
CPC .... G06F 40/30; G06F 16/3334; G06F 16/332; G06F 16/334; G06F 16/319; G06F 16/93; G06F 16/2428; G06F 16/313; G06F 16/685; G06F 16/951; G06F 16/9535; G06F 16/954; G06F 16/9566; G06F 40/166; G06F 40/279; G06F 16/338; G06F 16/355; G06F 16/31; G06F 16/337; G06F 16/9024; G06F 17/16; G06F 17/18; G06N 20/00; G06N 20/10; G06N 20/20; G06N 3/0427; G06N 3/0445; G06N 3/0454; G06N 3/0481; G06N 3/084; G06N 5/003; G06N 5/02;
(Continued)

(56) References Cited

U.S. PATENT DOCUMENTS 5,182,708 A   1/1993 Ejiri
5,371,807 A * 12/1994 Register ............... G06F 16/353
                                          382/159
(Continued)

OTHER PUBLICATIONS

Pratiksha Y. Pawar and S. H. Gawande, "A Comparative Study on Different Types of Approaches to Text Categorization," International Journal of Machine Learning and Computing, vol. 2 No. 4, Aug. 4, 2012, pp. 423-426.
(Continued)

*Primary Examiner* — Abdelali Serrou
(74) *Attorney, Agent, or Firm* — Harrity & Harrity, LLP

(57) ABSTRACT

A device receives a corpus of text documents, and utilizes feature extraction on a text document, of the corpus of text documents, to generate features from the text document, where the features include binary features, numeric features, and categorical features. The device performs feature engineering on one or more of the binary features, the numeric features, or the categorical features, to generate converted features, and performs feature encoding on the text document, based on the converted features, to represent the text document as a vector with a similarity score for a domain. The device provides the vector with the similarity score for the domain, as training data, to a machine learning model to generate a trained machine learning model, and performs an action using the trained machine learning model.

20 Claims, 12 Drawing Sheets

(58) Field of Classification Search
CPC .......... G06N 5/022; G06N 5/04; G06N 7/005; G10L 15/04
See application file for complete search history.

(56) References Cited

U.S. PATENT DOCUMENTS

| | | | |
|---|---|---|---|
| 6,192,360 B1 | 2/2001 | Dumais et al. | |
| 7,366,705 B2 | 4/2008 | Zeng et al. | |
| 7,689,531 B1* | 3/2010 | Diao | G06N 20/00 706/62 |
| 7,711,673 B1* | 5/2010 | Diao | G06F 40/126 706/62 |
| 7,853,599 B2* | 12/2010 | Liu | G06F 16/334 707/748 |
| 8,498,986 B1* | 7/2013 | Botros | G06Q 10/00 707/737 |
| 8,560,466 B2* | 10/2013 | Diao | G06N 20/00 706/12 |
| 9,292,493 B2* | 3/2016 | Chandramouli | G06F 40/30 |
| 9,645,999 B1* | 5/2017 | Ciulla | G06F 16/35 |
| 9,715,495 B1* | 7/2017 | Tacchi | G06F 16/358 |
| 9,740,368 B1* | 8/2017 | Love | G06F 3/04842 |
| 9,787,705 B1* | 10/2017 | Love | G06F 16/9024 |
| 9,836,183 B1* | 12/2017 | Love | G06F 16/9024 |
| 9,911,211 B1* | 3/2018 | Damaraju | G06F 16/904 |
| 2003/0101181 A1* | 5/2003 | Al-Kofahi | G06K 9/6292 |
| 2009/0282012 A1* | 11/2009 | Konig | G06F 40/295 |
| 2010/0185568 A1* | 7/2010 | Bates | G06N 20/00 706/12 |
| 2011/0213655 A1* | 9/2011 | Henkin | G06Q 30/0251 705/14.49 |
| 2012/0278263 A1* | 11/2012 | Borthwick | G06N 5/025 706/12 |
| 2013/0097103 A1* | 4/2013 | Chari | G06N 20/00 706/12 |
| 2014/0236941 A1* | 8/2014 | Johns | G06F 16/9566 707/730 |
| 2014/0337820 A1* | 11/2014 | Km | G06F 8/73 717/123 |
| 2016/0147891 A1* | 5/2016 | Chhichhia | G06F 16/986 707/734 |
| 2018/0039911 A1* | 2/2018 | Bezzubtseva | G06F 16/93 |
| 2018/0365248 A1* | 12/2018 | Zheng | G06F 40/40 |
| 2019/0108276 A1* | 4/2019 | Kovacs | G06F 16/243 |
| 2019/0236206 A1* | 8/2019 | Chowdhury | G06F 16/335 |
| 2019/0377784 A1* | 12/2019 | King | G06F 40/151 |
| 2020/0082810 A1* | 3/2020 | Kneller | G06N 5/047 |

OTHER PUBLICATIONS

Mehdi Allahyari, Seyedamin Pouriyeh, Mehdi Assefi, Saied Safaei, Elizabeth D. Trippe, Juan B. Gutierrez, and Krys Kochut, "A Brief Survey of Text Mining: Classification, Clustering and Extraction Techniques," Proceedings of KDD Bigdas, Halifax, Canada, Aug. 2017, 13 pages.

Chuong B. Do and Andrew Y. Ng, "Transfer learning for text classification," Advances in Neural Information Processing Systems 18 (NIPS 2005), Dec. 2005, 8 pages.

Wen Zhang, Taketoshi Yoshida, and Xijin Tang, "Text Classification using Multi-word Features," 2007 IEEE International Conference on Systems, Man and Cybernetics, Oct. 2007, 6 pages.

Aigars Mahinovs and Ashutosh Tiwari, "Text Classification Method Review," Rajkumar Roy and David Baxter (Eds.), Cranfield University, Apr. 2007, 21 pages.

* cited by examiner

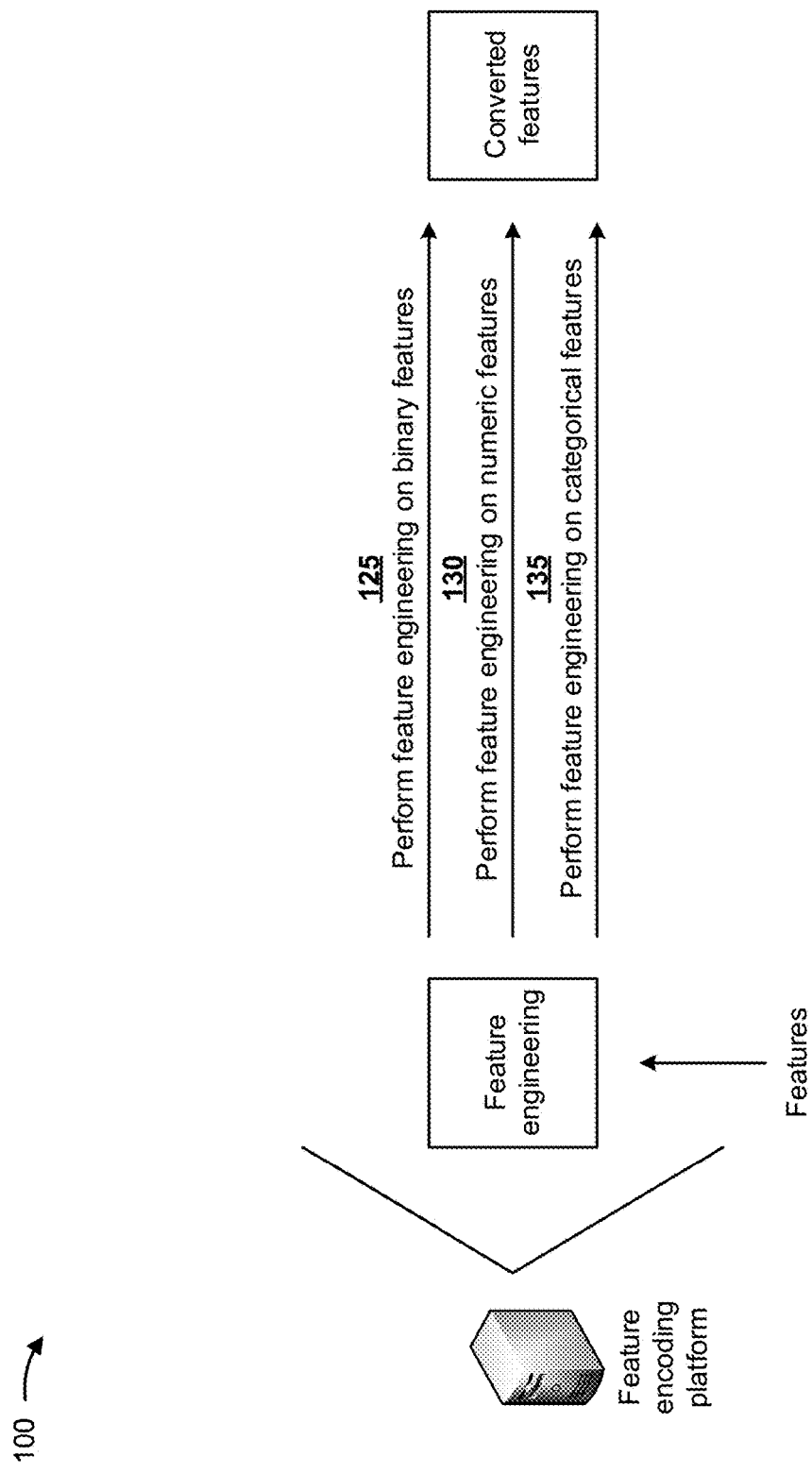

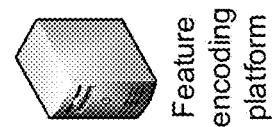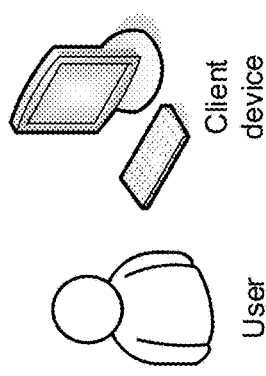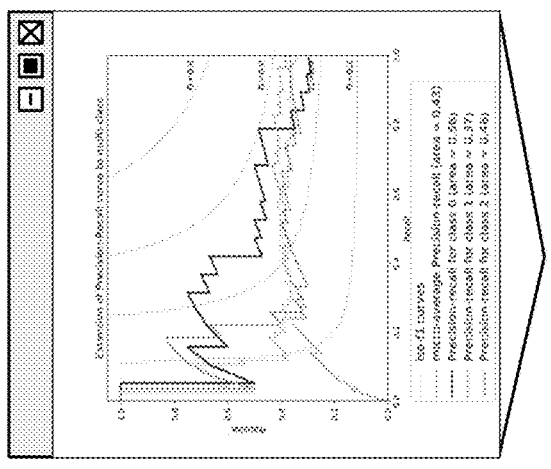
150
Perform an action based on results of the feature encoding
{Present results, further modify data, etc.}
FIG. 1G

AUTOMATED AND OPTIMAL ENCODING OF TEXT DATA FEATURES FOR MACHINE LEARNING MODELS

BACKGROUND

Feature engineering is an important step for preparing training data for machine learning models. Feature transformation and feature encoding are two steps in feature engineering. Feature encoding includes transformation of textual features (e.g., in structured data) into corresponding binary representations. For unstructured data, feature engineering may be difficult since there is no general or formal procedure for feature encoding of the unstructured data.

SUMMARY

According to some implementations, a device may include one or more memories, and one or more processors to receive a corpus of text documents, and utilize feature extraction on a text document, of the corpus of text documents, to generate features from the text document, where the features may include binary features, numeric features, and categorical features. The one or more processors may perform feature engineering on one or more of the binary features, the numeric features, or the categorical features, to generate converted features, and may perform feature encoding on the text document, based on the converted features, to represent the text document as a vector with a similarity score for a domain. The one or more processors may provide the vector with the similarity score for the domain, as training data, to a machine learning model to generate a trained machine learning model, and may perform an action using the trained machine learning model.

According to some implementations, a non-transitory computer-readable medium may store instructions that include one or more instructions that, when executed by one or more processors of a device, cause the one or more processors to receive a corpus of text documents that are unstructured, and utilize feature extraction on the text documents, of the corpus of text documents, to generate features from the text documents, where the features may include one or more of binary features, numeric features, or categorical features. The one or more instructions may cause the one or more processors to perform feature engineering on the one or more of the binary features, the numeric features, or the categorical features, to generate converted features, and perform feature encoding on the text documents, based on the converted features, to represent the text documents as vectors with similarity scores for a domain. The one or more instructions may cause the one or more processors to provide the vectors with the similarity scores for the domain, as training data, to a machine learning model to generate a trained machine learning model, and utilize the trained machine learning model to predict results.

According to some implementations, a method may include receiving a text document, and processing the text document with a feature extraction technique to generate features from the text document, where the features may include one or more of binary features, numeric features, or categorical features. The method may include processing the one or more of the binary features, the numeric features, or the categorical features, with a feature engineering technique to generate converted features, and processing the text document, with a feature encoding technique and based on the converted features, to represent the text document as a vector with a similarity score for a domain. The method may include providing the vector with the similarity score for the domain, as training data, to a machine learning model to generate a trained machine learning model, and performing an action using the trained machine learning model.

BRIEF DESCRIPTION OF THE DRAWINGS

FIGS. 1A-1G are diagrams of an example implementation described herein.

DETAILED DESCRIPTION OF PREFERRED EMBODIMENTS

The following detailed description of example implementations refers to the accompanying drawings. The same reference numbers in different drawings may identify the same or similar elements.

A machine learning model (e.g., a classifier) may receive data in a matrix format, where each row of the matrix represents a document vector and each column of the matrix represents a feature and/or attribute type. The value of each cell in the matrix can include a real value, an ordinal value, or a binary value, which a machine (e.g., a computing device) can understand and utilize. A current methodology for machine learning is suitable for structured data where features or a feature space (e.g., an input) and a target (e.g., an output) are known and can be easily modeled. A problem arises in the current methodology for unstructured data where the target (e.g., the output) is known but the feature space (e.g., the input) is undefined.

Some implementations described herein provide a feature encoding platform that provides automated and optimal encoding of text data features for machine learning models. For example, the feature encoding platform may receive a corpus of text documents, and may utilize feature extraction on a text document, of the corpus of text documents, to generate features from the text document, wherein the features may include binary features, numeric features, and categorical features. The feature encoding platform may perform feature engineering on one or more of the binary features, the numeric features, or the categorical features, to generate converted features, and may perform feature encoding on the text document, based on the converted features, to represent the text document as a vector with a similarity score for a domain. The feature encoding platform may provide the vector with the similarity score for the domain, as training data, to a machine learning model to generate a trained machine learning model, and may perform an action using the trained machine learning model.

In this way, the feature encoding platform may provide an end-to-end platform that extracts different features, encodes the features, and presents the encoded features to a machine learning model. Furthermore, the feature encoding platform may provide a methodology to encode unstructured data and train and test a machine learning model based on the encoded unstructured data. The feature encoding platform may conserve time and resources (e.g., processing resources, memory resources, and/or the like) associated with training and testing of a machine learning model with unstructured data, and may improve machine learning model training accuracy and testing accuracy when unstructured data is utilized.

Figure 1A:
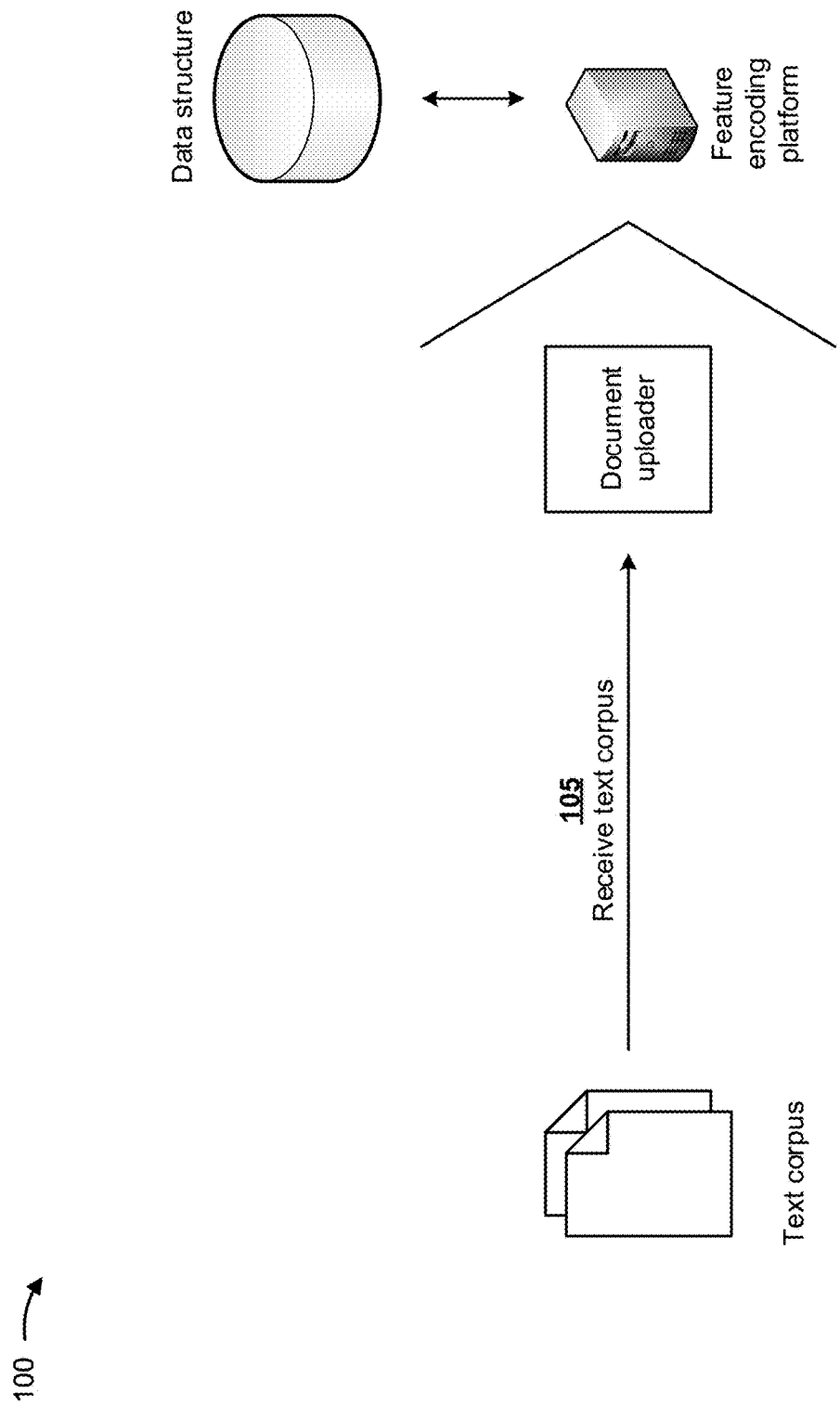

FIGS. 1A-1G are diagrams of an example implementation 100 described herein. As shown in FIG. 1A, and by reference number 105, a document uploader component of a feature encoding platform may receive a text corpus from a variety of sources. In some implementations, the source may include a client device, a server device, a data structure, and/or the like. In some implementations, the text corpus may include a corpus of text documents, and each text document may be unstructured. In some implementations, since the text documents are unstructured, the feature encoding platform may extract useful features from the text documents to generate discriminative features and to generalize a problem space, as described below. In some implementations, the feature encoding platform may utilize feature engineering to ensure that each feature (e.g., attribute) is presented as a fixed dimension vector that can be provided to a machine learning model, as described below. In some implementations, since a text space associated with the text documents may be very large, the feature encoding platform may utilize feature selection to reduce feature dimension, as described below. In some implementations, the text documents may include information that may be utilized to train and/or test a machine learning model.

As further shown in FIG. 1A, the feature encoding platform may be associated with a data structure (e.g., a database, a table, a list, and/or the like), and the feature encoding platform may store the text corpus in the data structure. In some implementations, the feature encoding platform may store the text documents of the text corpus in the data structure when the text documents are received from one of the sources. In some implementations, the data structure may include a structured query language (SQL) database.

In some implementations, the feature encoding platform may pre-process the text corpus before storing the text corpus in the data structure. For example, the feature encoding platform may utilize one or more pre-processing techniques to pre-process the text corpus, such as data cleansing techniques, data reduction techniques, data transformation techniques, and/or the like. In some implementations, the feature encoding platform may select the one or more pre-processing techniques based on a variety of factors, such as a type associated with the text corpus (e.g., video data, image data, text data, and/or the like), whether a source of the text corpus provides voluminous data that needs to be cleaned and/or reduced in size, whether the text corpus is provided in a format that requires conversion to a particular format that may be utilized by the feature encoding platform, and/or the like.

In some implementations, the data cleansing techniques may include techniques that detect and correct (or remove) corrupt or inaccurate records from the text corpus, and that identify incomplete, incorrect, inaccurate, or irrelevant portions of the text corpus and replace, modify, or delete the identified portions of the text corpus. In some implementations, the data reduction techniques may include techniques that transform numerical or alphabetical digital information (e.g., the text corpus) into a corrected, ordered, and simplified form, and that reduce a quantity of the text corpus to meaningful parts. In some implementations, the data transformation techniques may include techniques that convert the text corpus from one format or structure into another format or structure. The data transformation may be simple or complex based on required changes to the text corpus between source (initial) data and target (final) data.

In some implementations, the feature encoding platform may further pre-process the text corpus by cleaning the text corpus based on inconsistent values, duplicate records, invalid entries, and/or the like, by merging duplicate records based on industry-specific domain knowledge, and by transforming and scaling the text corpus using data manipulation and feature detection.

Figure 1B:
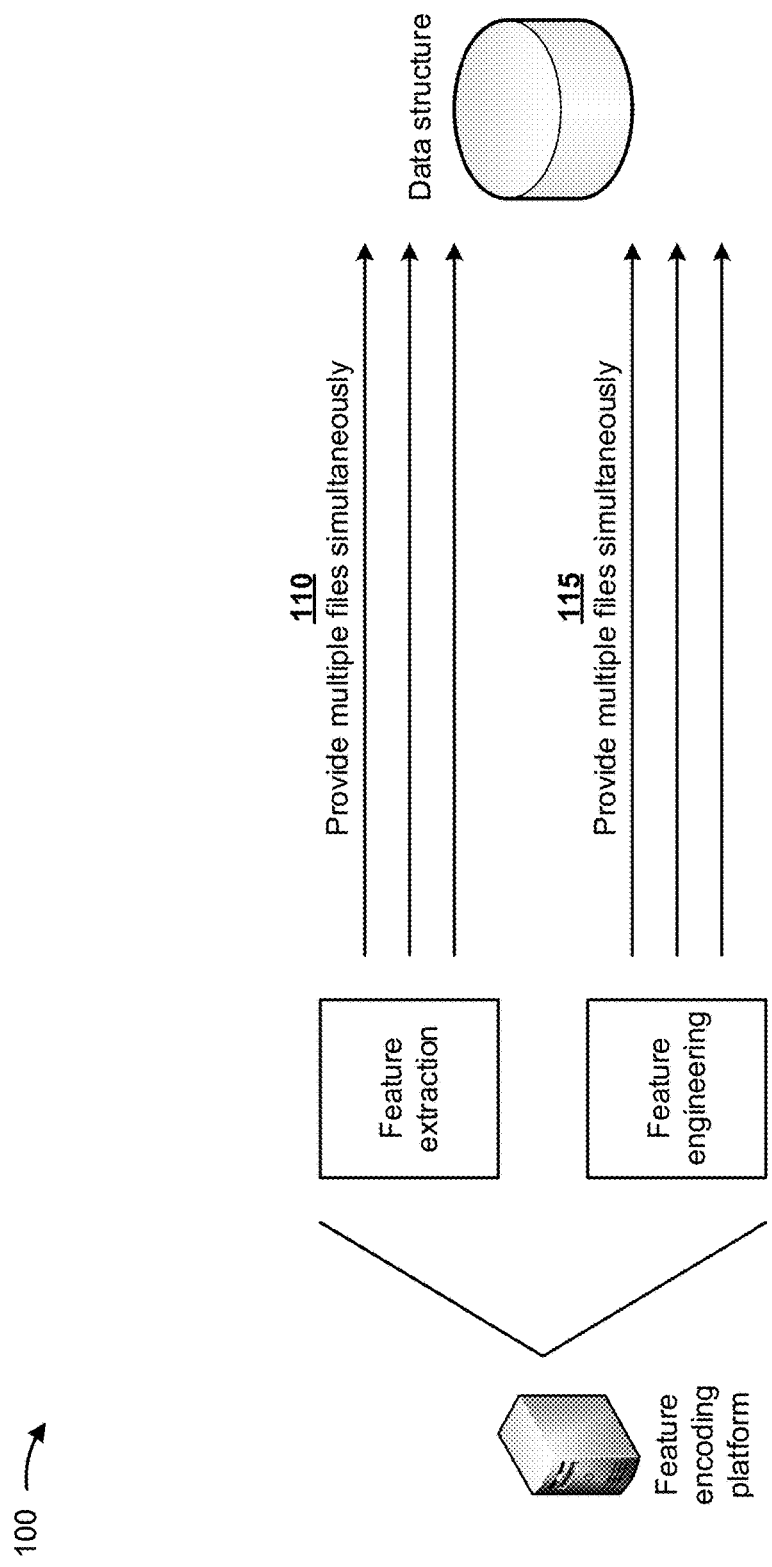

With reference to FIG. 1B, a feature extraction component of the feature encoding platform may perform feature extraction on the text corpus, as described below, to generate multiple files associated with the feature extraction (e.g., files indicating extracted features from the text documents of the text corpus). As further shown in FIG. 1B, and by reference number 110, the feature extraction component of the feature encoding platform may simultaneously provide the multiple files, associated with the feature extraction, to the data structure. With further reference to FIG. 1B, a feature engineering component of the feature encoding platform may perform feature engineering on the text corpus, as described below, to generate multiple files associated with the feature engineering (e.g., files indicating engineered features from the text documents of the text corpus). As further shown in FIG. 1B, and by reference number 115, the feature engineering component of the feature encoding platform may simultaneously provide the multiple files, associated with the feature engineering, to the data structure.

Current systems which receive a single text document from a data structure, generate a single file associated with feature extraction or feature engineering, and provide the single file to the data structure for storage. However, the single text document and single file exchange of the current systems provides a time consuming and resource intensive process. In contrast, the feature encoding platform may provide a job queue and worker threads for exchanging information (e.g., text documents and files) between the feature extraction component and the data structure and between the feature engineering component and the data structure. In this way, the feature encoding platform may significantly reduce a time it takes to exchange information between the feature extraction component and the data structure and between the feature engineering component and the data structure, and may conserve resources (e.g., processing resources, memory resources, and/or the like) associated with exchanging information.

Figure 1C:
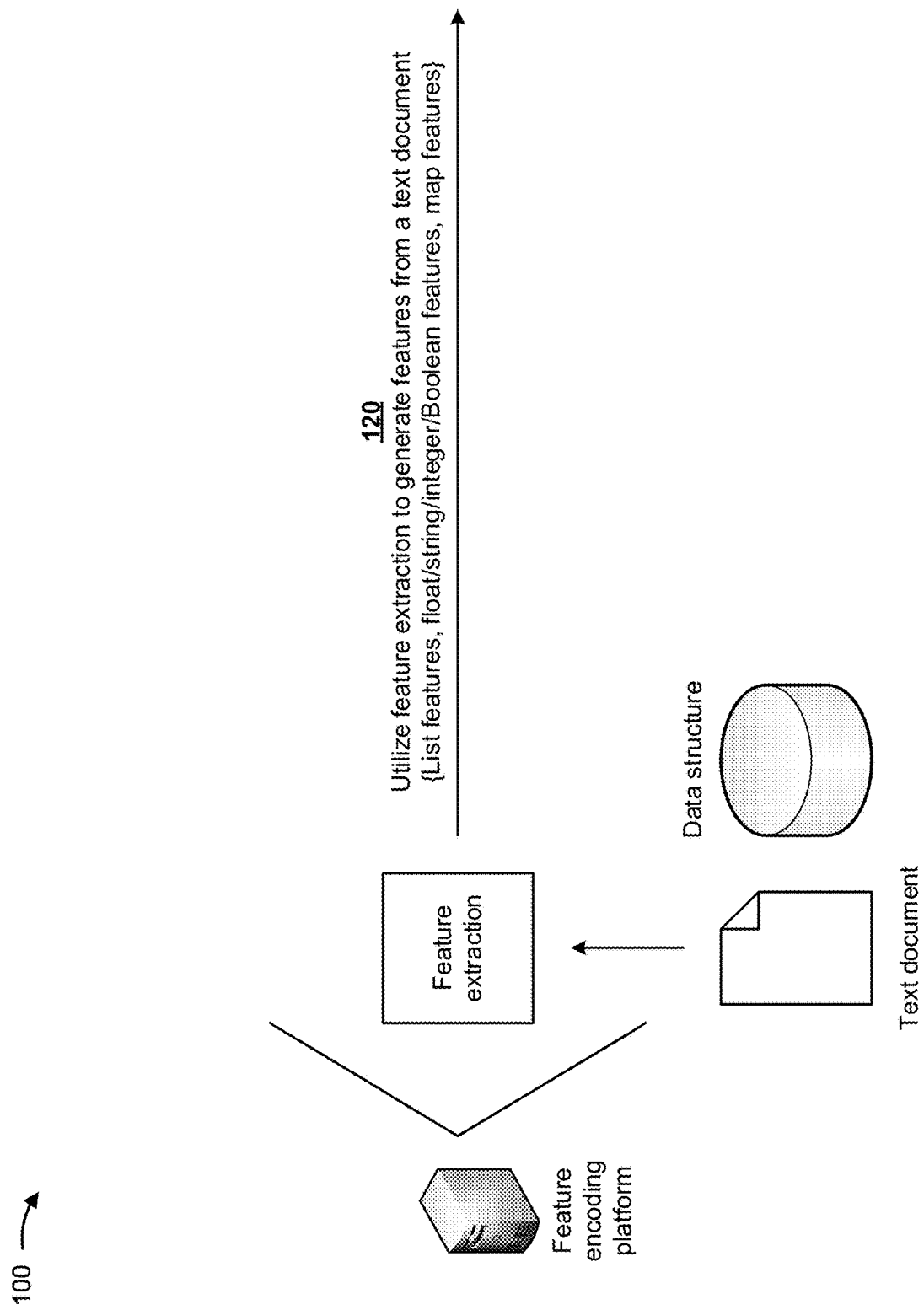

As shown in FIG. 1C, and by reference number 120, the feature extraction component of the feature encoding platform may utilize feature extraction to generate features from a text document of the text corpus. In some implementations, since a feature space of the text document is not defined, the feature extraction component may extract features from the text document at a word (e.g., a token) level, sentence level, and a document level. Lengths of the words and the sentences may vary from text document to text document, and the feature extraction component may vary a type of feature extracted from each text document (e.g., a parts of speech feature may be extracted for a word, a shallow parse tree output may be extracted for a sentence, a similarity score of each word may be extracted from a pre-defined set of words, and/or the like). In some implementations, the feature extraction model may extract the features from the text document in a machine-readable format and as fixed length vectors.

In some implementations, the extracted features may include list features (e.g., which may include float, string, and/or integer format), float format features, string format features, integer format features, Boolean format features, map features (e.g., which may include string, integer, float, and/or Boolean format), and/or the like.

As shown in FIG. 1D, and by reference number 125, a feature engineering component of the feature encoding platform may perform feature engineering on binary features of the features extracted by the feature extraction component (e.g., to generate converted features). In some implementations, the binary features may include parts of speech regular expression features, headword features, capitalization features, special character features, role features, context window features, and/or the like. In some implementations, the feature engineering component may convert the binary features into a quantity of true instances that are included in the converted features. In some implementations, the feature engineering component may encode the binary features (e.g., based on an empirical analysis of the binary features) to generate scaled (e.g., converted) features. In some implementations, the feature engineering component utilize one or more encoding techniques to encode the binary features. For example, the feature engineering component may utilize a log transformation technique to encode the binary features (e.g., by compressing large values and enlarging small values). The feature engineering component may utilize a scaling technique to encode the binary features (e.g., standard scaling, min max scaling, and/or the like to scale the feature space). The feature engineering component may utilize a log transformation and scaling technique to encode the binary features (e.g., log transformation, standard scaling, and min max scaling may be applied to smooth feature values). The feature engineering component may utilize a binarization technique to encode the binary features (e.g., convert to a yes/no feature to represent whether a value is present or not). The feature engineering component may utilize a binning technique to encode the binary features (e.g., select a different range bucket to convert a count into a categorical value).

As further shown in FIG. 1D, and by reference number 130, the feature engineering component of the feature encoding platform may perform feature engineering on numeric features of the features extracted by the feature extraction component (e.g., to generate converted features). In some implementations, the numeric features may include semantic similarity features, Jaro Winkler score features, Jaccard similarity score features, and/or the like. In some implementations, the feature engineering component may perform a conversion of the numeric features to generate similarity scores for each word in the text document based on a pre-defined set of words. In some implementations, the feature engineering component may encode the converted numeric features to generate encoded features. In some implementations, the feature engineering component may utilize one or more encoding techniques to encode the numeric features. For example, the feature engineering component may utilize a technique that identifies a number of words having similarity with a pre-defined set of words. Such a technique may generate an integer count that may be encoded with a log transformation technique, a feature scaling technique, a log transformation and feature scaling technique, a binning technique, a binarization technique, and/or the like. The feature engineering component may utilize a technique that identifies a number of words that are similar to an inverse number of words in the text document. Such a technique may generate normalized float values, which may be converted to integer values and encoded with a log transformation technique, a feature scaling technique, a log transformation and feature scaling technique, a binning technique, a binarization technique, and/or the like.

In some implementations, the numeric features may include word vector features. In some implementations, the feature engineering component may perform a conversion of the word vector features to represent each word as a fixed sized vector, and to add and normalize the fixed size vectors based on the number words. In such implementations, the feature engineering component need not encode the converted word vector features since the word vector features are already represented as a fixed size vector.

In some implementations, the numeric features may include bag of word features, term frequency inverse document frequency features, latent semantic indexing features, latent Dirichlet allocation features, and/or the like. In some implementations, the feature engineering component may perform a conversion of such numeric features so that the text document is represented as a fixed sized vector. In such implementations, the feature engineering component need not encode such numeric features since such numeric are already represented as a fixed size vector.

As further shown in FIG. 1D, and by reference number 135, the feature engineering component of the feature encoding platform may perform feature engineering on categorical features of the features extracted by the feature extraction component (e.g., to generate converted features). In some implementations, the categorical features may include parts of speech tagging features, stemming and Lemma features, suffix and prefix features, and/or the like. In some implementations, the feature engineering component may perform a conversion of the categorical features to generate converted features. For example, for the parts of speech tagging features, the feature engineering component may convert a word, represented by a part of speech, to an n-gram sequence in order to represent a context of the word (e.g., to encode sequence information). For stemming and Lemma features, the feature engineering component may convert a word to a primary form by applying stemming and Lemma. For suffix and prefix features, the feature engineering component may represent each suffix and/or prefix of a word as a variable size vector of a string. In some implementations, values in the variable size vector may represent different categories of data, and binarization may be applied to the variable size vector in order to represent the variable size vectors as a fixed sized vector. In some implementations, correlated categories may be merged to reduce vector size, since a quantity of categories can be very large.

Figure 1E:
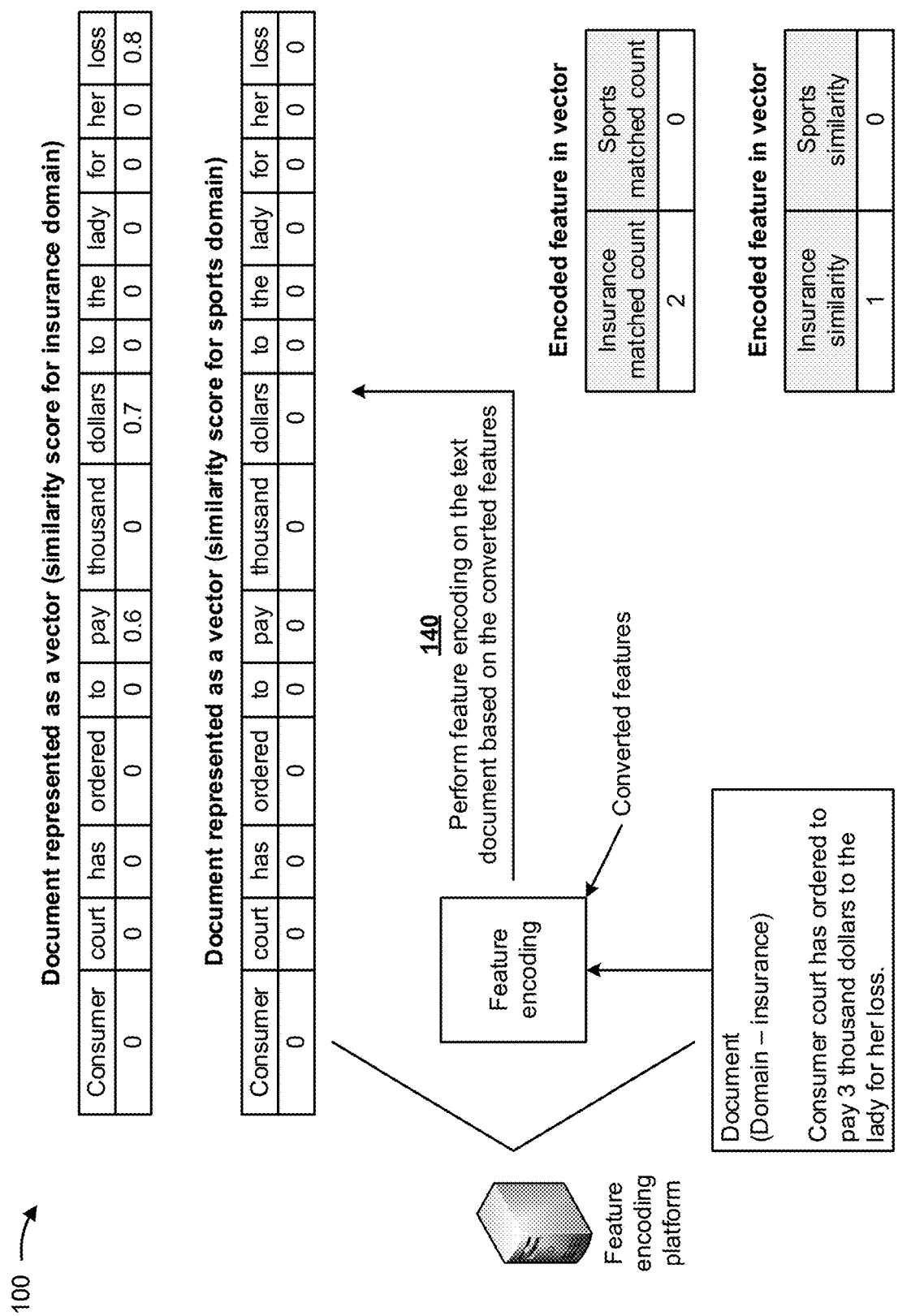

As shown in FIG. 1E, a feature encoding component of the feature encoding platform may receive the converted features and the text document. The text document may be related to the insurance domain and may include the text "Consumer court has ordered to pay 3 thousand dollars to the lady for her loss." As further shown in FIG. 1E, and by reference number 140, the feature encoding component may perform feature encoding on the text document based on the converted features. In some implementations, the feature encoding component may utilize a semantic similarity representation to perform the feature encoding on the text document. In such implementations, the feature encoding component may utilize a domain ontology to extract domain words associated with domains (e.g., an insurance domain and a sports domain). The feature encoding component may determine a similarity between the words in the text document and word in the domain ontology, and may present a score for each word with a similarity score (e.g., between zero and one). The feature encoding component may generate a vector with a size equal to a quantity of words in the text documents, and where each value represents the similarity score with the domain ontology for both domains. For example, a first vector may represent the text document with similarity scores for the insurance domain, and a second vector may represent the text document with similarity scores the sports domain.

As shown in FIG. 1E, since the text document relates to insurance, the first vector may include similarity scores greater than zero for the words "pay," "dollars," and "loss" of the text document. As further shown in FIG. 1E, since the text document does not relate to sports, the second vector may not include similarity scores greater than zero for any words of the text document. In some implementations, the feature encoding component may count a quantity of words having similarity scores greater than a particular threshold (e.g., 0.6). The feature encoding component may determine that the text document represents an insurance type document since the quantity of words (e.g., two) having similarity scores greater than the particular threshold for the insurance domain is greater than the quantity of words (e.g., zero) having similarity scores greater than the particular threshold for the sports domain.

Figure 1F:
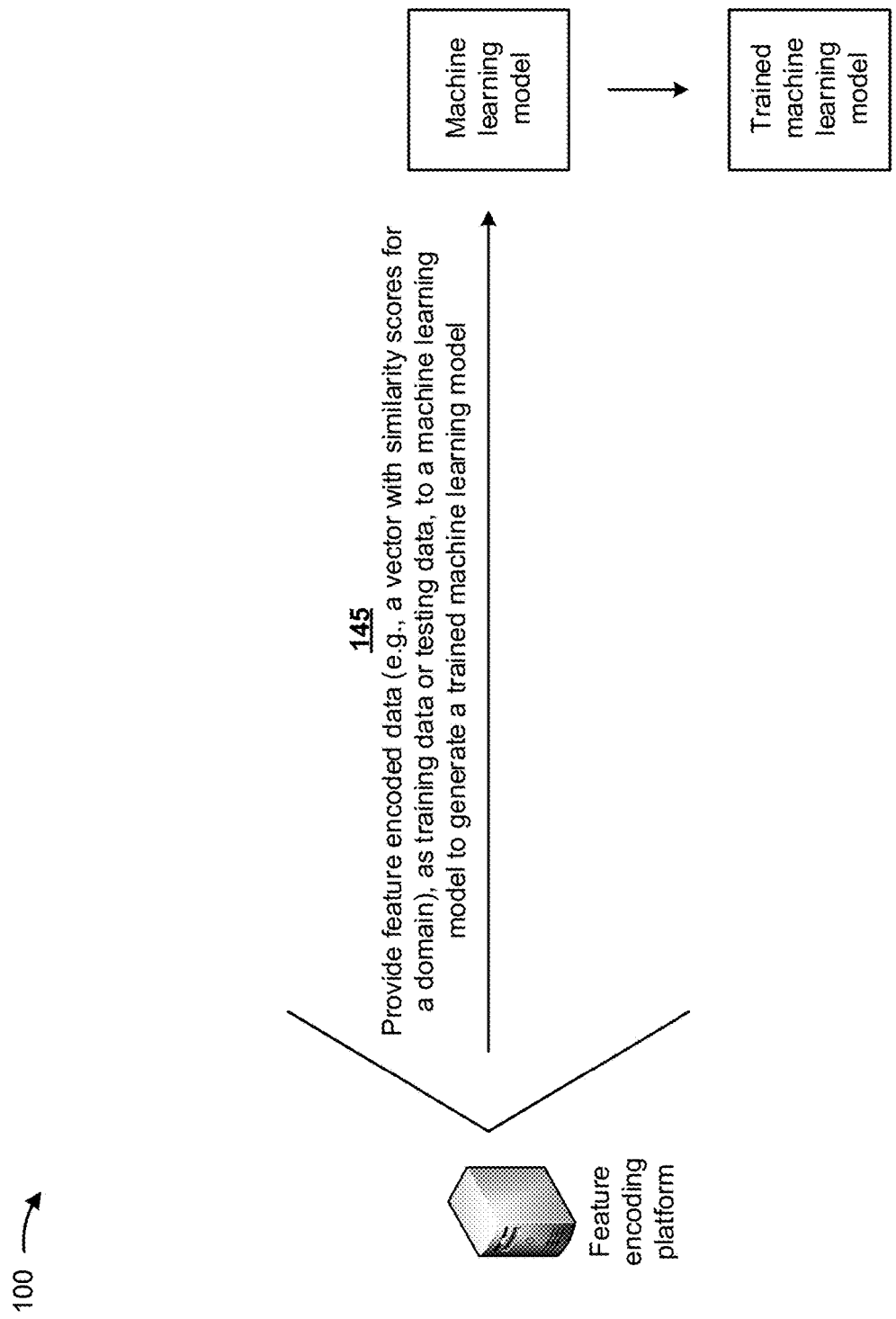

As shown in FIG. 1F, and by reference number 145, the feature encoding platform may provide feature encoded data, as training data or testing data, to a machine learning model to generate a trained machine learning model. In some implementations, the machine learning model may include a classification model, a support vector machine model, a linear regression model, a logistic regression model, a naive Bayes model, a linear discriminant analysis model, a decision tree model, a k-nearest neighbor model, a neural network model, a clustering model (e.g., a k-means clustering model, a density-based spatial clustering of applications with noise (DBSCAN) mode, etc.), and/or the like.

In some implementations, the feature encoding platform may perform a training operation on the machine learning model with the feature encoded data. For example, the feature encoding platform may separate the feature encoded data into a training set, a validation set, a test set, and/or the like. In some implementations, the feature encoding platform may train the machine learning model using, for example, an unsupervised training procedure and based on the training set of the feature encoded data. For example, the feature encoding platform may perform dimensionality reduction to reduce the feature encoded data to a minimum feature set, thereby reducing resources (e.g., processing resources, memory resources, and/or the like) to train the machine learning model, and may apply a classification technique, to the minimum feature set.

In some implementations, the feature encoding platform may use a logistic regression classification technique to determine a categorical outcome (e.g., that a text document relates to a particular domain). Additionally, or alternatively, the feature encoding platform may use a naïve Bayesian classifier technique. In this case, the feature encoding platform may perform binary recursive partitioning to split the feature encoded data into partitions and/or branches, and use the partitions and/or branches to perform predictions (e.g., that a text document relates to a particular domain). Based on using recursive partitioning, the feature encoding platform may reduce utilization of computing resources relative to manual, linear sorting and analysis of data points, thereby enabling use of thousands, millions, or billions of data points to train a machine learning model, which may result in a more accurate model than using fewer data points.

Additionally, or alternatively, the feature encoding platform may use a support vector machine (SVM) classifier technique to generate a non-linear boundary between data points in the training set. In this case, the non-linear boundary is used to classify test data into a particular class.

Additionally, or alternatively, the feature encoding platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the feature encoding platform may use one or more other model training techniques, such as a neural network technique, a latent semantic indexing technique, and/or the like. For example, the feature encoding platform may perform an artificial neural network processing technique (e.g., using a two-layer feedforward neural network architecture, a three-layer feedforward neural network architecture, and/or the like) to perform pattern recognition with regard to patterns of whether a text document relates to a particular domain. In this case, using the artificial neural network processing technique may improve an accuracy of the trained machine learning model generated by the feature encoding platform by being more robust to noisy, imprecise, or incomplete data, and by enabling the feature encoding platform to detect patterns and/or trends undetectable to human analysts or systems using less complex techniques.

As shown in FIG. 1G, and by reference number 150, the feature encoding platform may perform an action based on results of the feature encoding. For example, the feature encoding platform may provide results of the feature encoding to a client device, and the client device may present the results to a user of the client device. In some implementations, the results may include information indicating a quantity of training data (e.g., of the feature encoded data) utilized to train the machine learning model, a quantity of test data (e.g., of the feature encoded data) utilized to test the machine learning model, a training accuracy associated with the machine learning model, a test accuracy associated with the machine learning model, and/or the like. In some implementations, the results may indicate that the feature encoding platform significantly improves training accuracy and test accuracy compared to conventional systems, significantly reduces time spent training and testing the machine learning model compared to conventional systems, and significantly reduces resource (e.g., processing resources, memory resources, and/or the like) usage compared to conventional systems.

In some implementations, the feature encoding platform may utilize the trained machine learning model to predict an outcome. For example, the feature encoding platform may process additional text documents, with the trained machine learning model, in order to predict domain types (e.g., a political domain, a sports domain, an insurance domain, a legal domain, etc.) associated with the additional text documents.

In some implementations, if testing of the machine learning model indicates that the machine learning model needs more training, the feature encoding platform may re-perform the feature extraction, the feature engineering, and the feature encoding on the text corpus or on a new text corpus. In this way, the feature encoding platform may generate improved feature encoded data that may be used to further train and/or test the machine learning model.

In some implementations, the feature encoding platform may validate the machine learning model based on the feature encoded data. For example, the feature encoding platform may designate a portion of the feature encoded data as validation data, and may utilize the validation data to validate the trained machine learning model.

In some implementations, the feature encoding platform may receive a new text corpus, and may utilize the new text corpus to generate new feature encoded data. The feature encoding platform may re-train and/or re-test the machine learning model based on the new feature encoded data.

In this way, several different stages of the process for optimally encoding text data features for machine learning models are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically and optimally encodes text data features (e.g., for unstructured data) for machine learning models. Finally, automating the process for optimally encoding text data features for machine learning models conserves computing resources (e.g., processing resources, memory resources, and/or the like) that would otherwise be wasted in attempting to encode text data features for machine learning models.

As indicated above, FIGS. 1A-1G are provided merely as examples. Other examples are possible and may differ from what was described with regard to FIGS. 1A-1G.

Figure 2:
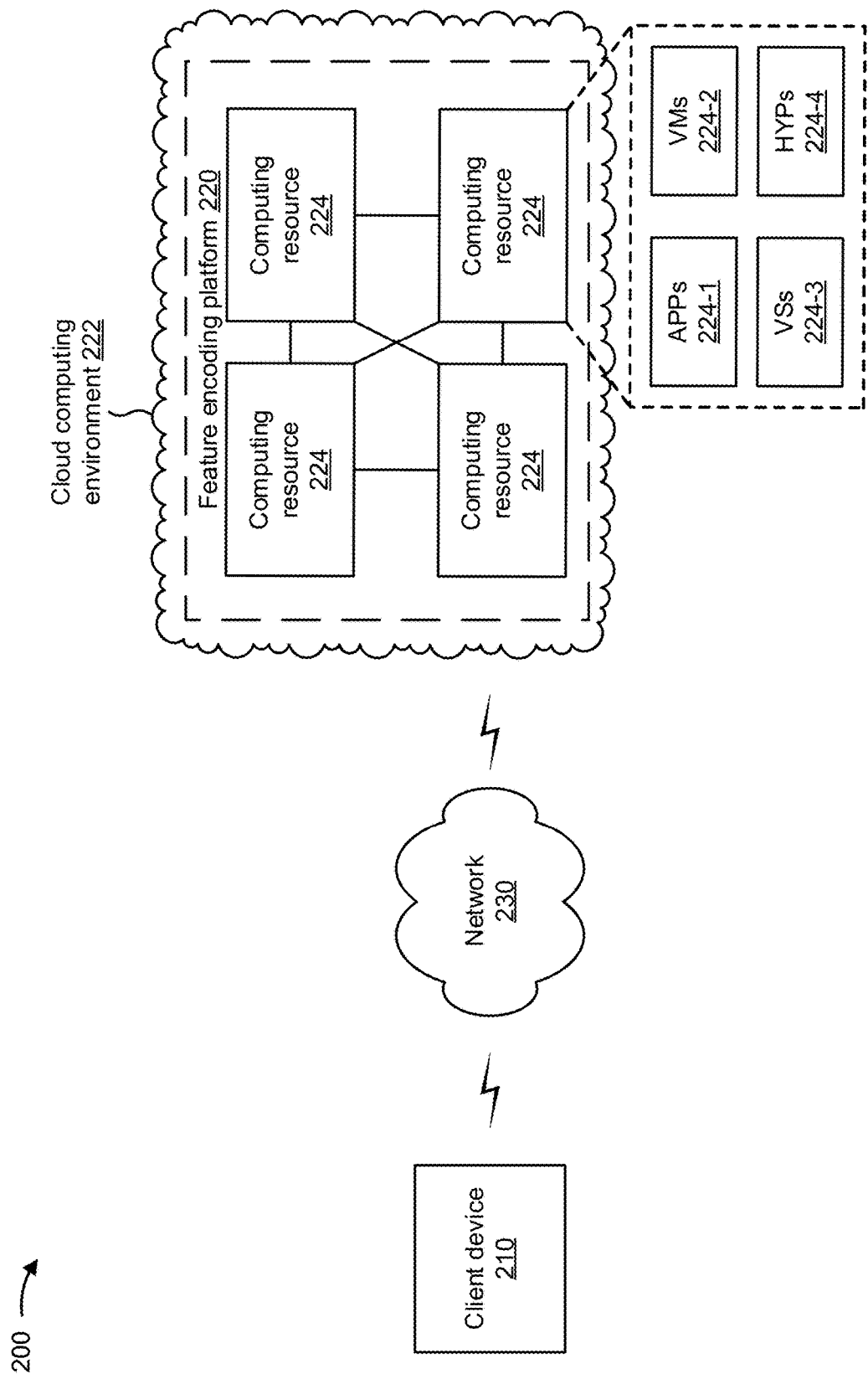
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a feature encoding platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to feature encoding platform 220.

Feature encoding platform 220 includes one or more devices that provide automated and optimal encoding of text data features for machine learning models. In some implementations, feature encoding platform 220 may be designed to be modular such that certain software components may be swapped in or out depending on a particular need. As such, feature encoding platform 220 may be easily and/or quickly reconfigured for different uses. In some implementations, feature encoding platform 220 may receive information from and/or transmit information to one or more client devices 210.

In some implementations, as shown, feature encoding platform 220 may be hosted in a cloud computing environment 222. Notably, while implementations described herein describe feature encoding platform 220 as being hosted in cloud computing environment 222, in some implementations, feature encoding platform 220 may not be cloud-based (i.e., may be implemented outside of a cloud computing environment) or may be partially cloud-based.

Cloud computing environment 222 includes an environment that hosts feature encoding platform 220. Cloud computing environment 222 may provide computation, software, data access, storage, etc. services that do not require end-user knowledge of a physical location and configuration of system(s) and/or device(s) that host feature encoding platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host feature encoding platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with feature encoding platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of feature encoding platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
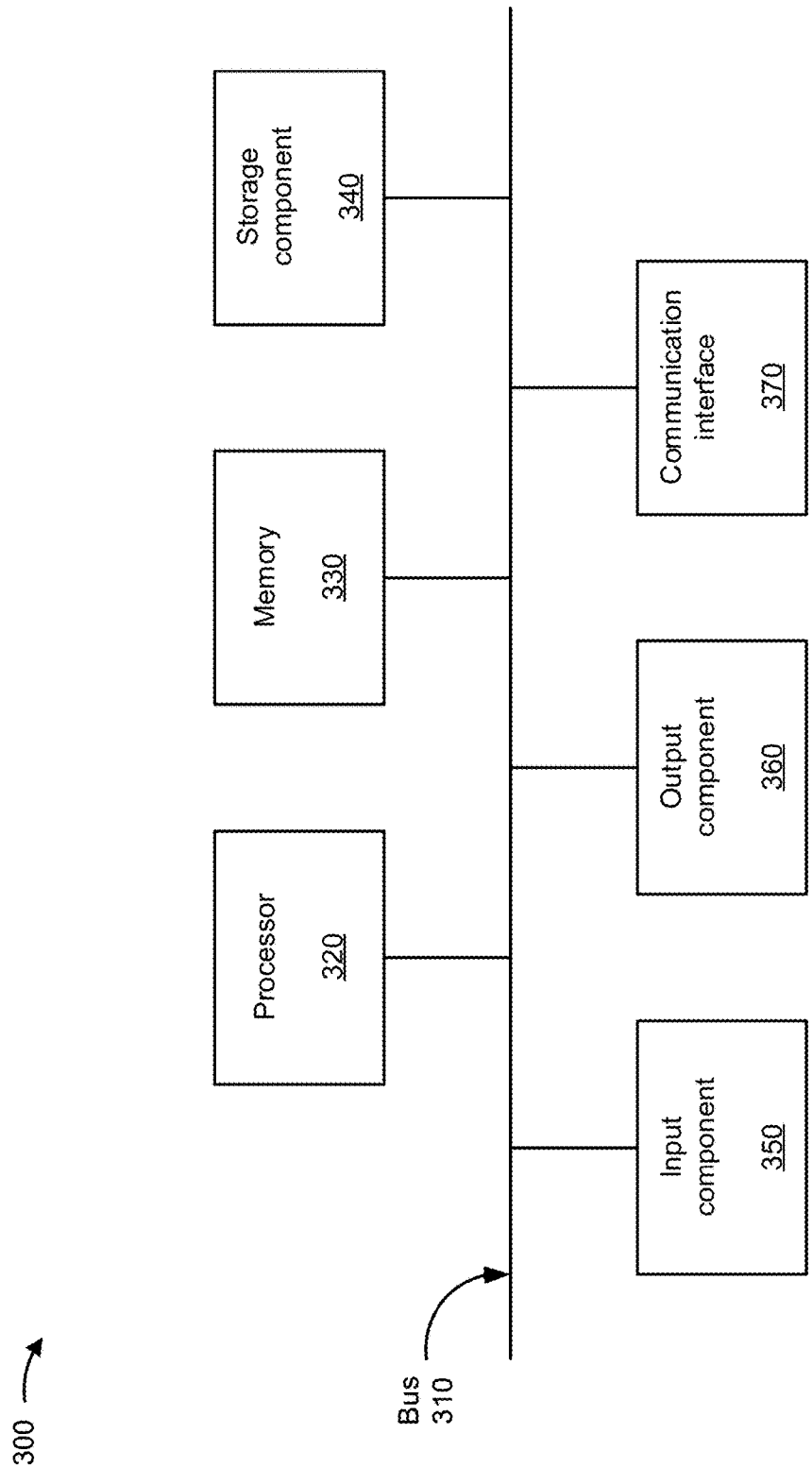
FIG. 3 is a diagram of example components of one or more devices of FIG. 2.

FIG. 3 is a diagram of example components of a device 300. Device 300 may correspond to client device 210, feature encoding platform 220, and/or computing resource 224. In some implementations, client device 210, feature encoding platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
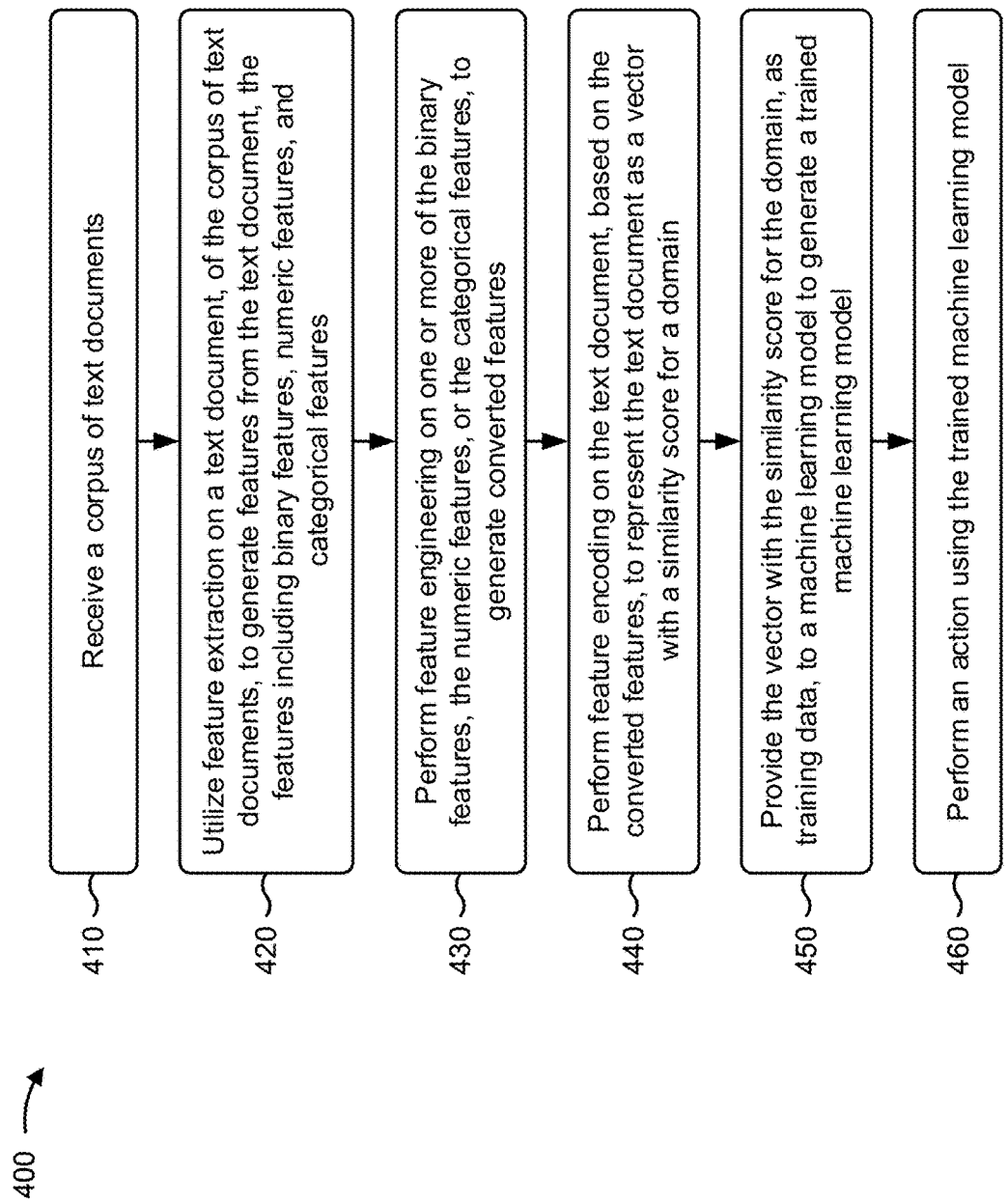
FIGS. 4-6 are flow charts of example processes for automated and optimal encoding of text data features for machine learning models.

FIG. 4 is a flow chart of an example process 400 for automated and optimal encoding of text data features for machine learning models. In some implementations, one or more process blocks of FIG. 4 may be performed by a feature encoding platform (e.g., feature encoding platform 220). In some implementations, one or more process blocks of FIG. 4 may be performed by another device or a group of devices separate from or including the feature encoding platform, such as a client device (e.g., client device 210).

As shown in FIG. 4, process 400 may include receiving a corpus of text documents (block 410). For example, the feature encoding platform (e.g., using computing resource 224, processor 320, communication interface 370, and/or the like) may receive a corpus of text documents, as described above in connection with FIGS. 1A-2.

As further shown in FIG. 4, process 400 may include utilizing feature extraction on a text document, of the corpus of text documents, to generate features from the text document, wherein the features include binary features, numeric features, and categorical features (block 420). For example, the feature encoding platform (e.g., using computing resource 224, processor 320, memory 330, and/or the like) may utilize feature extraction on a text document, of the corpus of text documents, to generate features from the text document, wherein the features include binary features, numeric features, and categorical features, as described above in connection with FIGS. 1A-2.

As further shown in FIG. 4, process 400 may include performing feature engineering on one or more of the binary features, the numeric features, or the categorical features, to generate converted features (block 430). For example, the feature encoding platform (e.g., using computing resource 224, processor 320, storage component 340, and/or the like) may perform feature engineering on one or more of the binary features, the numeric features, or the categorical features, to generate converted features, as described above in connection with FIGS. 1A-2.

As further shown in FIG. 4, process 400 may include performing feature encoding on the text document, based on the converted features, to represent the text document as a vector with a similarity score for a domain (block 440). For example, the feature encoding platform (e.g., using computing resource 224, processor 320, memory 330, and/or the like) may perform feature encoding on the text document, based on the converted features, to represent the text document as a vector with a similarity score for a domain, as described above in connection with FIGS. 1A-2.

As further shown in FIG. 4, process 400 may include providing the vector with the similarity score for the domain, as training data, to a machine learning model to generate a trained machine learning model (block 450). For example, the feature encoding platform (e.g., using computing resource 224, processor 320, storage component 340, and/or the like) may provide the vector with the similarity score for the domain, as training data, to a machine learning model to generate a trained machine learning model, as described above in connection with FIGS. 1A-2.

As further shown in FIG. 4, process 400 may include performing an action using the trained machine learning model (block 460). For example, the feature encoding platform (e.g., using computing resource 224, processor 320, memory 330, communication interface, and/or the like) may perform an action using the trained machine learning model, as described above in connection with FIGS. 1A-2.

Process 400 may include additional implementations, such as any single implementation or any combination of implementations described below and/or described with regard to any other process described herein.

In some implementations, the features may include a word feature, a sentence feature, a document feature, a list feature, a float feature, a string feature, an integer feature, a Boolean feature, a map feature, and/or the like. In some implementations, the feature encoding platform, when performing the feature engineering on the binary features, may convert the binary features into a quantity of true instances that are included in the converted features.

In some implementations, the feature encoding platform, when performing the feature engineering on the numeric features, may convert the numeric features into similarity scores, that are included in the converted features, based on a pre-defined set of words, or convert the numeric features into fixed sized vectors that are included in the converted features. In some implementations, the feature encoding platform, when performing the feature engineering on the categorical features, may convert the categorical features into n-gram sequences that are included in the converted features, convert the categorical features into primary forms that are included in the converted features, convert the categorical features into variable size vectors that are included in the converted features, and/or the like.

In some implementations, the feature encoding platform, when performing the feature encoding on the text document, may encode the converted features into scaled features based on an empirical analysis, wherein the scaled features being is to represent the text document as the vector with the similarity score for the domain, or may encode the converted features into encoded features, wherein the encoded features may be used to represent the text document as the vector with the similarity score for the domain. In some implementations, the feature encoding platform may determine vectors with similarity scores for the domain for text documents in the corpus of text documents, other than the text document, and may provide the vectors with the similarity scores for the domain, as the training data, to the machine learning model to generate the trained machine learning model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
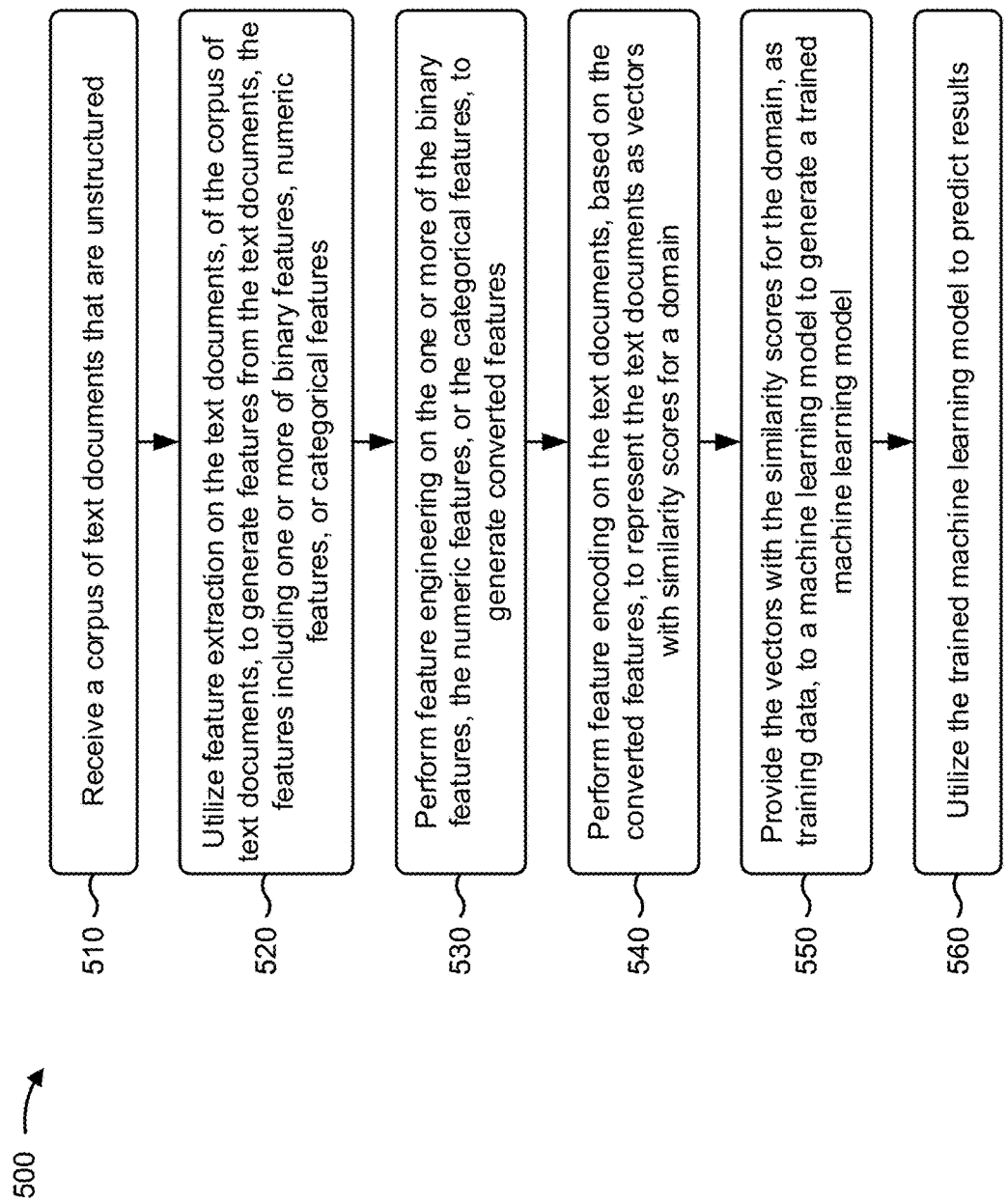

FIG. 5 is a flow chart of an example process 500 for automated and optimal encoding of text data features for machine learning models. In some implementations, one or more process blocks of FIG. 5 may be performed by a feature encoding platform (e.g., feature encoding platform 220). In some implementations, one or more process blocks of FIG. 5 may be performed by another device or a group of devices separate from or including the feature encoding platform, such as a client device (e.g., client device 210).

As shown in FIG. 5, process 500 may include receiving a corpus of text documents that are unstructured (block 510). For example, the feature encoding platform (e.g., using computing resource 224, processor 320, communication interface 370, and/or the like) may receive a corpus of text documents that are unstructured, as described above in connection with FIGS. 1A-2.

As further shown in FIG. 5, process 500 may include utilizing feature extraction on the text documents, of the corpus of text documents, to generate features from the text documents, wherein the features include one or more of binary features, numeric features, or categorical features (block 520). For example, the feature encoding platform (e.g., using computing resource 224, processor 320, memory 330, and/or the like) may utilize feature extraction on the text documents, of the corpus of text documents, to generate features from the text documents, wherein the features include one or more of binary features, numeric features, or categorical features, as described above in connection with FIGS. 1A-2.

As further shown in FIG. 5, process 500 may include performing feature engineering on the one or more of the binary features, the numeric features, or the categorical features, to generate converted features (block 530). For example, the feature encoding platform (e.g., using computing resource 224, processor 320, storage component 340, and/or the like) may perform feature engineering on the one or more of the binary features, the numeric features, or the categorical features, to generate converted features, as described above in connection with FIGS. 1A-2.

As further shown in FIG. 5, process 500 may include performing feature encoding on the text documents, based on the converted features, to represent the text documents as vectors with similarity scores for a domain (block 540). For example, the feature encoding platform (e.g., using computing resource 224, processor 320, memory 330, and/or the like) may perform feature encoding on the text documents, based on the converted features, to represent the text documents as vectors with similarity scores for a domain, as described above in connection with FIGS. 1A-2.

As further shown in FIG. 5, process 500 may include providing the vectors with the similarity scores for the domain, as training data, to a machine learning model to generate a trained machine learning model (block 550). For example, the feature encoding platform (e.g., using computing resource 224, processor 320, storage component 340, and/or the like) may provide the vectors with the similarity scores for the domain, as training data, to a machine learning model to generate a trained machine learning model, as described above in connection with FIGS. 1A-2.

As further shown in FIG. 5, process 500 may include utilizing the trained machine learning model to predict results (block 560). For example, the feature encoding platform (e.g., using computing resource 224, processor 320, memory 330, and/or the like) may utilize the trained machine learning model to predict results, as described above in connection with FIGS. 1A-2.

Process 500 may include additional implementations, such as any single implementation or any combination of implementations described below and/or described with regard to any other process described herein.

In some implementations, the feature encoding platform may provide the vectors with the similarity scores for the domain, as testing data, to the trained machine learning model, and may determine an accuracy of the trained machine learning model based on providing the vectors with the similarity scores for the domain, as the testing data, to the trained machine learning model. In some implementations, the machine learning model may include a classification model, a support vector machine model, a linear regression model, a logistic regression model, a naive Bayes model, a linear discriminant analysis model, a decision tree model, a k-nearest neighbor model, a clustering model, a neural network model, and/or the like.

In some implementations, the feature encoding platform, when performing the feature engineering on the one or more of the binary features, the numeric features, or the categorical features, may convert the binary features into a quantity of true instances that are included in the converted features. In some implementations, the feature encoding platform, when performing the feature engineering on the one or more of the binary features, the numeric features, or the categorical features, may convert the numeric features into similarity scores, that are included in the converted features, based on a pre-defined set of words, or may convert the numeric features into fixed sized vectors that are included in the converted features.

In some implementations, the feature encoding platform, when performing the feature engineering on the one or more of the binary features, the numeric features, or the categorical features, may convert the categorical features into n-gram sequences that are included in the converted features, may convert the categorical features into primary forms that are included in the converted features, may convert the categorical features into variable size vectors that are included in the converted features, and/or the like.

In some implementations, the feature encoding platform, when performing the feature encoding on the text documents, may encode the converted features into scaled features based on an empirical analysis, wherein the scaled features may be used to represent the text documents as the vectors with the similarity scores for the domain, or may encode the converted features into encoded features, wherein the encoded features may be used to represent the text documents as the vectors with the similarity scores for the domain.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
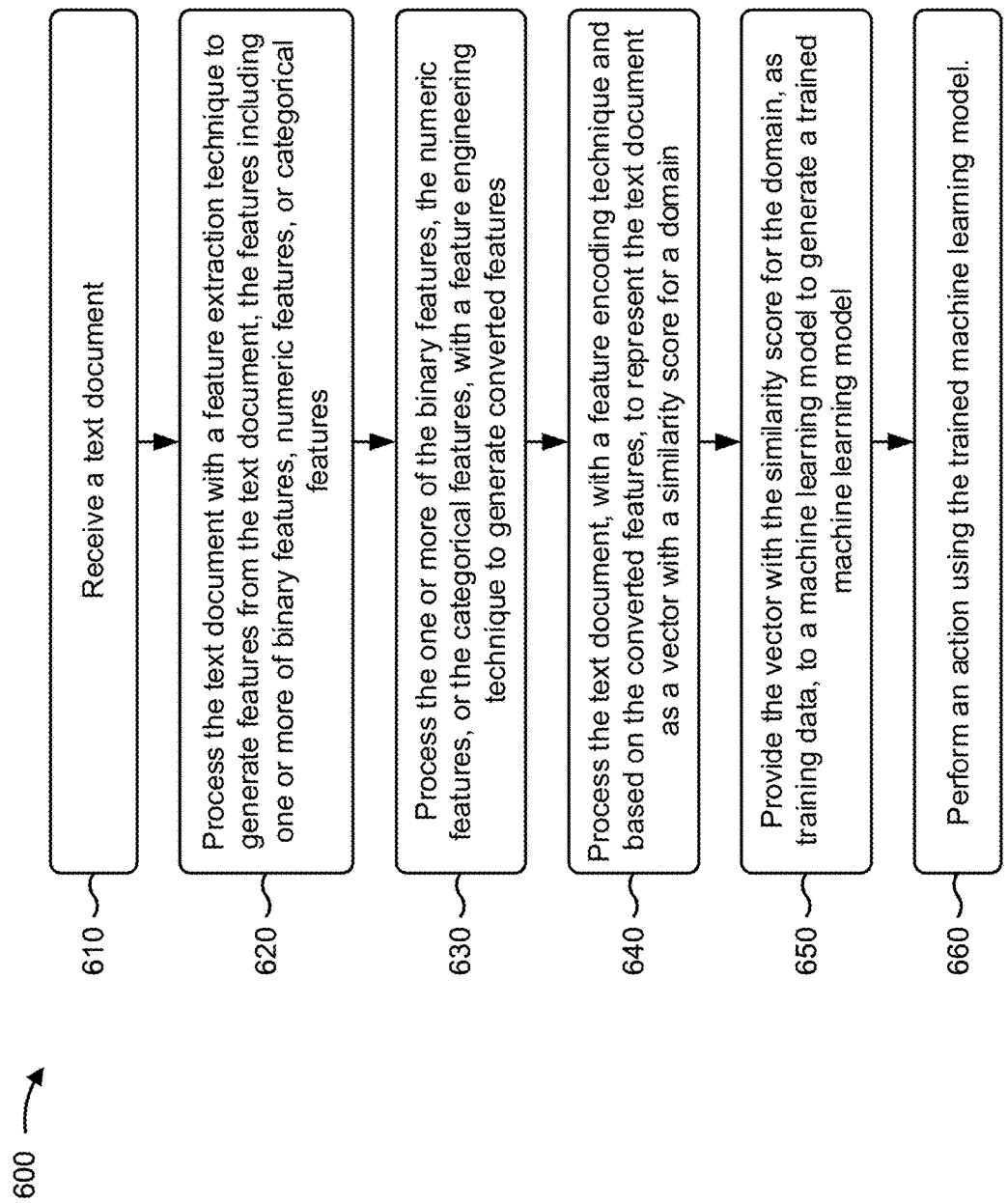

FIG. 6 is a flow chart of an example process 600 for automated and optimal encoding of text data features for machine learning models. In some implementations, one or more process blocks of FIG. 6 may be performed by a feature encoding platform (e.g., feature encoding platform 220). In some implementations, one or more process blocks of FIG. 6 may be performed by another device or a group of devices separate from or including the feature encoding platform, such as a client device (e.g., client device 210).

As shown in FIG. 6, process 600 may include receiving a text document (block 610). For example, the feature encoding platform (e.g., using computing resource 224, processor 320, communication interface 370, and/or the like) may receive a text document, as described above in connection with FIGS. 1A-2.

As further shown in FIG. 6, process 600 may include processing the text document with a feature extraction technique to generate features from the text document, wherein the features include one or more of binary features, numeric features, or categorical features (block 620). For example, the feature encoding platform (e.g., using computing resource 224, processor 320, storage component 340, and/or the like) may process the text document with a feature extraction technique to generate features from the text document, wherein the features include one or more of binary features, numeric features, or categorical features, as described above in connection with FIGS. 1A-2.

As further shown in FIG. 6, process 600 may include processing the one or more of the binary features, the numeric features, or the categorical features, with a feature engineering technique to generate converted features (block 630). For example, the feature encoding platform (e.g., using computing resource 224, processor 320, memory 330, and/or the like) may process the one or more of the binary features, the numeric features, or the categorical features, with a feature engineering technique to generate converted features, as described above in connection with FIGS. 1A-2.

As further shown in FIG. 6, process 600 may include processing the text document, with a feature encoding technique and based on the converted features, to represent the text document as a vector with a similarity score for a domain (block 640). For example, the feature encoding platform (e.g., using computing resource 224, processor 320, storage component 340, and/or the like) may process the text document, with a feature encoding technique and based on the converted features, to represent the text document as a vector with a similarity score for a domain, as described above in connection with FIGS. 1A-2.

As further shown in FIG. 6, process 600 may include providing the vector with the similarity score for the domain, as training data, to a machine learning model to generate a trained machine learning model (block 650). For example, the feature encoding platform (e.g., using computing resource 224, processor 320, memory 330, and/or the like) may provide the vector with the similarity score for the domain, as training data, to a machine learning model to generate a trained machine learning model, as described above in connection with FIGS. 1A-2.

As further shown in FIG. 6, process 600 may include performing an action using the trained machine learning model (block 660). For example, the feature encoding platform (e.g., using computing resource 224, processor 320, memory 330, storage component 340, communication interface 370, and/or the like) may perform an action using the trained machine learning model, as described above in connection with FIGS. 1A-2.

Process 600 may include additional implementations, such as any single implementation or any combination of implementations described below and/or described with regard to any other process described herein.

In some implementations, the feature encoding platform, when processing the one or more of the binary features, the numeric features, or the categorical features with the feature engineering technique may convert the binary features into a quantity of true instances that are included in the converted features, may convert the numeric features into similarity scores, that are included in the converted features, based on a pre-defined set of words, may convert the numeric features into fixed sized vectors that are included in the converted features, may convert the categorical features into n-gram sequences that are included in the converted features, may convert the categorical features into primary forms that are included in the converted features, may convert the categorical features into variable size vectors that are included in the converted features, and/or the like.

In some implementations, the feature encoding platform, when processing the text document with the feature encoding technique, may encode the converted features into scaled features based on an empirical analysis, wherein the scaled features may be used to represent the text document as the vector with the similarity score for the domain, or may encode the converted features into encoded features, wherein the encoded features may be used to represent the text document as the vector with the similarity score for the domain.

In some implementations, the feature encoding platform may determine vectors with similarity scores for the domain for additional text documents, and may provide the vectors with the similarity scores for the domain, as the training data, to the machine learning model to generate the trained machine learning model. In some implementations, the feature encoding technique may include a semantic similarity technique that represents the text document as the vector with the similarity score for the domain. In some implementations, the feature extraction technique, the feature engineering technique, and the feature encoding technique may process the text document to represent the text document in a format understood by the machine learning model.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a feature encoding platform that provides automated and optimal encoding of text data features for machine learning models. For example, the feature encoding platform may receive a corpus of text documents, and may utilize feature extraction on a text document, of the corpus of text documents, to generate features from the text document, wherein the features may include binary features, numeric features, and categorical features. The feature encoding platform may perform feature engineering on one or more of the binary features, the numeric features, or the categorical features, to generate converted features, and may perform feature encoding on the text document, based on the converted features, to represent the text document as a vector with a similarity score for a domain. The feature encoding platform may provide the vector with the similarity score for the domain, as training data, to a machine learning model to generate a trained machine learning model, and may perform an action using the trained machine learning model.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
  receive a corpus of text documents;
  utilize feature extraction on a text document, of the corpus of text documents, to generate features from the text document,
    the features including:
      binary features,
      numeric features, and
      categorical features;
  perform feature engineering on the numeric features to generate converted features by generating similarity scores for each word in the text document based on a pre-defined set of words;
  perform feature encoding on the text document, based on the converted features, to represent the text document as a first vector with a first similarity score for a first domain and as a second vector with a second similarity score for a second domain,
    wherein the one or more processors, when performing the feature encoding, are to:
      determine a similarity between words in the text document and one or more words in a first domain ontology associated with the first domain and one or more words in a second domain ontology associated with the second domain,
      present the first similarity score for each word associated with the first domain in the text document and the second similarity score for each word associated with the second domain in the text document,
      generate the first vector with a size equal to a quantity of the words associated with the first domain in the text document and the second vector with a size equal to a quantity of words associated with the second domain in the text document,
      where each value in the first vector represents the first similarity score for the first domain and each value in the second vector represents the second similarity score for the second domain, and
    determine that the first vector with the first similarity score is greater than the second vector with the second similarity score;
  provide the first vector with the first similarity score for the first domain, as training data, to a machine learning model to generate a trained machine learning model; and
  perform an action using the trained machine learning model.

2. The device of claim 1, wherein the features include one or more of:
  a word feature,
  a sentence feature,
  a document feature,
  a list feature,
  a float feature,
  a string feature,
  an integer feature,
  a Boolean feature, or
  a map feature.

3. The device of claim 1, wherein the one or more processors, are further to:
  perform the feature engineering on the binary features by converting the binary features into a quantity of true instances that are included in the converted features.

4. The device of claim 1, wherein the one or more processors, when performing the feature engineering on the numeric features, are further to:
  convert the numeric features into fixed sized vectors that are included in the converted features.

5. The device of claim 1, wherein the one or more processors are further to:
  perform the feature engineering on the categorical features by one or more of:
    converting the categorical features into n-gram sequences that are included in the converted features, or
    converting the categorical features into primary forms that are included in the converted features.

6. The device of claim 1, wherein the one or more processors are further to:
  determine vectors with similarity scores for the first domain for text documents in the corpus of text documents, other than the text document; and
  provide the vectors with the similarity scores for the first domain, as the training data, to the machine learning model to generate the trained machine learning model.

7. A non-transitory computer-readable medium storing instructions, the instructions comprising:
  one or more instructions that, when executed by one or more processors of a device, cause the one or more processors to:
    receive a corpus of text documents that are unstructured;
    utilize feature extraction on the text documents, of the corpus of text documents, to generate features from the text documents,
      the features including one or more of:
        binary features,
        numeric features, or
        categorical features;
    perform feature engineering on the numeric features to generate converted features by generating similarity scores for each word in the text document based on a pre-defined set of words;
    perform feature encoding on the text documents, based on the converted features, to represent the text documents as a first vector with a first similarity score for a first domain and as a second vector with a second similarity score for a second domain,
      wherein the one or more instructions, that cause the one or more processors to perform the feature encoding, cause the one or more processors to:

determine a similarity between words in the text document and one or more words in a first domain ontology associated with the first domain and one or more words in a second domain ontology associated with the second domain, present the first similarity score for each word associated with the first domain in the text document and the second similarity score for each word associated with the second domain in the text document, generate the first vector with a size equal to a quantity of the words associated with the first domain in the text document and the second vector with a size equal to a quantity of the words associated with the second domain in the text document, where each value in the first vector represents the first similarity score for the first domain and each value in the second vector represents the second similarity score for the second domain, and determine that the first vector with the first similarity score is greater than the second vector with the second similarity score;

provide the first vector with the first similarity score for the first domain, as training data, to a machine learning model to generate a trained machine learning model; and utilize the trained machine learning model to predict results.

8. The non-transitory computer-readable medium of claim 7, wherein the instructions further comprise:
one or more instructions that, when executed by the one or more processors, cause the one or more processors to:
provide the first vector with the first similarity score for the first domain, as testing data, to the trained machine learning model; and
determine an accuracy of the trained machine learning model based on providing the first vector with the first similarity score for the first domain, as the testing data, to the trained machine learning model.

9. The non-transitory computer-readable medium of claim 7, wherein the machine learning model includes one or more of:
a classification model,
a support vector machine model,
a linear regression model,
a logistic regression model,
a naive Bayes model,
a linear discriminant analysis model,
a decision tree model,
a k-nearest neighbor model,
a clustering model, or
a neural network model.

10. The non-transitory computer-readable medium of claim 7, wherein the one or more instructions, when executed by the one or more processors, cause the one or more processors to:
perform feature engineering on the binary features by converting the binary features into a quantity of true instances that are included in the converted features.

11. The non-transitory computer-readable medium of claim 7, wherein the one or more instructions, that cause the one or more processors to perform the feature engineering on the numeric features, cause the one or more processors to:
convert the numeric features into fixed sized vectors that are included in the converted features.

12. The non-transitory computer-readable medium of claim 7, wherein the one or more instructions, when executed by the one or more processors, cause the one or more processors to:
perform feature engineering on the categorical features by one or more of:
converting the categorical features into n-gram sequences that are included in the converted features;
converting the categorical features into primary forms that are included in the converted features; or
converting the categorical features into variable size vectors that are included in the converted features.

13. A method, comprising:
receiving, by a device, a text document;
processing, by the device, the text document with a feature extraction technique to generate features from the text document,
the features including one or more of:
binary features,
numeric features, or
categorical features;
processing, by the device, the numeric features with a feature engineering technique to generate converted features, by generating similarity scores for each word in the text document based on a pre-defined set of words;
processing, by the device, the text document, with a feature encoding technique and based on the converted features, to represent the text document as a first vector with a first similarity score for a first domain and as a second vector with a second similarity score for a second domain,
wherein processing the text document with the feature encoding technique comprises:
determining a similarity between words in the text document and one or more words in a first domain ontology associated with the first domain and one or more words in a second domain ontology associated with the second domain,
presenting the first similarity score for each word associated with the first domain in the text document and the second similarity score for each word associated with the second domain in the text document,
generating the first vector with a size equal to a quantity of the words associated with the first domain in the text document and the second vector with a size equal to a quantity of the words associated with the second domain in the text document,
where each value in the first vector represents the first similarity score for the first domain and each value in the second vector represents the second similarity score for the second domain, and
determining that the first vector with the first similarity score is greater than the second vector with the second similarity score;
providing, by the device, the first vector with the first similarity score for the first domain, as training data, to a machine learning model to generate a trained machine learning model; and
performing, by the device, an action using the trained machine learning model.

14. The method of claim 13, further comprising:
processing the binary features, the numeric features, or the categorical features with the feature engineering technique includes one or more of:
converting the binary features into a quantity of true instances that are included in the converted features;
converting the numeric features into fixed sized vectors that are included in the converted features;
converting the categorical features into n-gram sequences that are included in the converted features;
converting the categorical features into primary forms that are included in the converted features; or
converting the categorical features into variable size vectors that are included in the converted features.

15. The method of claim 13, further comprising:
determining vectors with the similarity scores for the first domain for additional text documents; and
providing the vectors with the similarity scores for the first domain, as the training data, to the machine learning model to generate the trained machine learning model.

16. The method of claim 13, wherein the feature extraction technique, the feature engineering technique, and the feature encoding technique process the text document to:
represent the text document in a format understood by the machine learning model.

17. The device of claim 1, wherein the one or more processors are further to:
perform feature engineering on the binary features by utilizing a log transformation and scaling technique to encode the binary features to generate the converted features.

18. The non-transitory computer-readable medium of claim 7, wherein the one or more instructions, when executed by the one or more processors, further cause the one or more processors to:
perform feature engineering on the binary features by utilizing a log transformation and scaling technique to encode the binary features to generate the converted features.

19. The method of claim 13, further comprising:
performing feature engineering on the binary features by utilizing a log transformation and scaling technique to encode the binary features to generate the converted features.

20. The method of claim 13, further comprising:
providing the first vector with the first similarity score for the first domain, as testing data, to the trained machine learning model; and
determining an accuracy of the trained machine learning model based on providing the first vector with the first similarity score for the first domain, as the testing data, to the trained machine learning model.

\* \* \* \* \*